(12) United States Patent
McDonald et al.

(10) Patent No.: US 8,468,770 B2
(45) Date of Patent: Jun. 25, 2013

(54) FLOOR COVERING PRODUCT AND METHOD OF USING SAME

(75) Inventors: Raiford McDonald, Dalton, GA (US); Byoung-In Cho, Cohutta, GA (US)

(73) Assignee: Textile Rubber & Chemical Company, Inc., Dalton, GA (US)

( * ) Notice: Subject to any disclaimer, the term of this patent is extended or adjusted under 35 U.S.C. 154(b) by 353 days.

(21) Appl. No.: 12/565,442

(22) Filed: Sep. 23, 2009

(65) Prior Publication Data

US 2011/0067336 A1    Mar. 24, 2011

(51) Int. Cl.
*E04B 1/00* (2006.01)
*E04G 23/00* (2006.01)

(52) U.S. Cl.
USPC ..... 52/746.1; 52/309.4; 52/309.9; 52/745.21; 52/403.1; 52/746.11; 428/86; 428/95

(58) Field of Classification Search
USPC .......... 52/309.4, 309.9, 741.4, 745.21, 746.1, 52/403.1, 746.11; 428/86, 95, 411.1, 423.7, 428/425.1, 319.3
See application file for complete search history.

(56) References Cited

U.S. PATENT DOCUMENTS

| | | | |
|---|---|---|---|
| 2,145,284 A | 1/1939 | Anderson et al. | |
| 2,250,669 A | 7/1941 | Jamgotchian | |
| 3,275,469 A | 9/1966 | Streit | |
| 3,276,944 A | 10/1966 | Martin | |
| 3,305,428 A | 2/1967 | Moore et al. | |
| 3,496,055 A | 2/1970 | Hart, Jr. | |
| 3,501,564 A | 3/1970 | Brage et al. | |
| 3,516,894 A | 6/1970 | Slosberg | |
| 3,531,342 A | 9/1970 | Dorn | |
| 3,586,598 A | 6/1971 | Beemer | |
| 3,661,687 A | 5/1972 | Spinney, Jr. et al. | |
| 3,704,197 A | 11/1972 | Bahlo | |
| 3,728,204 A | 4/1973 | Cochran, II | |
| 3,770,536 A | 11/1973 | Haigh | |
| 3,795,567 A | 3/1974 | Hoffman | |
| 3,900,656 A | 8/1975 | Schmidt | |
| 3,935,352 A | 1/1976 | Toland | |
| 4,075,377 A | 2/1978 | Aitchison et al. | |
| 4,152,473 A | 5/1979 | Layman | |
| 4,172,917 A | 10/1979 | Angelle et al. | |
| 4,187,337 A | 2/1980 | Romageon | |
| 4,497,853 A | 2/1985 | Tomarin | |

(Continued)

FOREIGN PATENT DOCUMENTS

GB    2271519 A    4/1994

OTHER PUBLICATIONS

Glassy State and Glass-Rubber Transition, http://mail.vssd.nl/hlf/m028ch03.pdf, Sep. 27, 2003.

(Continued)

*Primary Examiner* — Joshua J Michener
*Assistant Examiner* — Chi Q Nguyen
(74) *Attorney, Agent, or Firm* — Robert E. Richards, Esq.; Johnson, Marcou & Isaacs, LLC

(57) ABSTRACT

The invention comprises an improved floor covering product. The floor covering product comprises a floor covering material having a face surface and a back surface. On the back surface of the floor covering material is a layer of polyurethane having a cure index of between approximately 70 and 90. A method of using the floor covering product is also disclosed.

23 Claims, 5 Drawing Sheets

U.S. PATENT DOCUMENTS

| | | | |
|---|---|---|---|
| 4,557,774 A | | 12/1985 | Hoopengardner |
| 4,696,849 A | * | 9/1987 | Mobley et al. ............... 428/95 |
| 4,731,275 A | | 3/1988 | Andersen |
| 4,743,509 A | | 5/1988 | Vladimiro |
| 4,762,741 A | | 8/1988 | Hedley |
| 4,783,354 A | | 11/1988 | Fagan |
| 4,797,170 A | | 1/1989 | Hoopengardner |
| 4,804,572 A | | 2/1989 | Bodrogi |
| 4,818,573 A | * | 4/1989 | Nishiwaki ............... 427/403 |
| 4,849,265 A | * | 7/1989 | Ueda et al. ............... 428/40.4 |
| 4,849,267 A | | 7/1989 | Ward et al. |
| 4,853,280 A | * | 8/1989 | Poteet ............... 442/30 |
| 4,925,908 A | | 5/1990 | Bernard et al. |
| 4,942,093 A | | 7/1990 | Lawson |
| 5,040,346 A | | 8/1991 | White |
| 5,082,705 A | * | 1/1992 | Rose ............... 428/41.3 |
| 5,116,439 A | | 5/1992 | Raus |
| 5,198,277 A | * | 3/1993 | Hamilton et al. ............... 428/92 |
| 5,401,553 A | | 3/1995 | Miwa et al. |
| 5,401,560 A | | 3/1995 | Williams |
| 5,425,908 A | * | 6/1995 | Merser ............... 264/46.4 |
| 5,470,630 A | | 11/1995 | Thompson |
| 5,501,895 A | | 3/1996 | Finley |
| 5,504,282 A | * | 4/1996 | Pizzirusso et al. ............... 181/290 |
| 5,536,571 A | | 7/1996 | Pearson et al. |
| 5,540,968 A | * | 7/1996 | Higgins ............... 428/95 |
| 5,567,497 A | | 10/1996 | Zegler et al. |
| 5,578,363 A | | 11/1996 | Finley et al. |
| 5,595,041 A | | 1/1997 | Hoopengardner |
| 5,604,009 A | | 2/1997 | Long et al. |
| 5,639,539 A | | 6/1997 | DeProspero et al. |
| 5,948,500 A | * | 9/1999 | Higgins ............... 428/95 |
| 6,012,261 A | | 1/2000 | McDonald |
| 6,193,826 B1 | * | 2/2001 | Starr et al. ............... 156/71 |
| 6,217,974 B1 | * | 4/2001 | Pacione ............... 428/95 |
| 6,224,700 B1 | | 5/2001 | Oakley |
| 6,245,177 B1 | | 6/2001 | Luhmann |
| 6,438,908 B1 | | 8/2002 | McDonald |
| 6,591,578 B2 | | 7/2003 | McDonald |
| 6,790,872 B2 | | 9/2004 | Kazmierski et al. |
| 6,800,682 B1 | | 10/2004 | Windhoevel et al. |
| 6,860,953 B1 | * | 3/2005 | Grizzle et al. ............... 156/72 |
| 6,938,386 B2 | * | 9/2005 | Ritland et al. ............... 52/408 |
| 2002/0037956 A1 | | 3/2002 | Avramidis et al. |
| 2002/0059762 A1 | | 5/2002 | Takeuchi et al. |
| 2002/0119306 A1 | | 8/2002 | Enewoldsen et al. |
| 2002/0187298 A1 | | 12/2002 | Hauber et al. |
| 2003/0158331 A1 | | 8/2003 | Shoaf et al. |
| 2004/0216406 A1 | | 11/2004 | Egashira |
| 2006/0059825 A1 | | 3/2006 | Wiercinski et al. |
| 2006/0100335 A1 | | 5/2006 | Yalvac et al. |
| 2006/0105663 A1 | | 5/2006 | Greulich et al. |
| 2007/0277450 A1 | | 12/2007 | Raulie |
| 2009/0041820 A1 | | 2/2009 | Wu et al. |
| 2009/0068406 A1 | | 3/2009 | Race et al. |
| 2009/0071097 A1 | | 3/2009 | McDonald |

OTHER PUBLICATIONS

Measuring and Understanding Tg (Glass Transition Temperature), http://www.arlon-med.com/Measuring_and_Understanding_Tg.pdf, Dec. 24, 2005.

Information on Rubber, http://www.merl-ltd.co.uk/2003_materials/rubber11a.shtml, Nov. 20, 2003.

* cited by examiner

FLOOR COVERING PRODUCT AND METHOD OF USING SAME

FIELD OF THE INVENTION

The present invention generally relates to floor covering products and to methods of installing floor covering products on flooring surfaces. More particularly, this invention relates to floor covering products that do not require an adhesive to apply them to and retain them on a floor surface. The present invention also relates to methods of installing these floor covering products without the use of traditional adhesives or tack strips.

BACKGROUND OF THE INVENTION

Wall-to-wall or broadloom carpet has been a popular floor covering for many years. However, the methods of installing wall-to-wall carpet have not changed much over the years. Typically, wall-to-wall carpet is installed by nailing tack strips around the periphery of a room in which the carpet is to be installed. If the carpet does not include an integral cushion or pad, a separate cushioning pad may then be placed on the floor between the tack strips. The carpet is cut to a size slightly larger than the actual size of the room. One edge of the carpet is then secured to the tack strips adjacent that edge and trimmed with a knife to exact size, usually to fit under a baseboard. The carpet is then stretched so that it is under tension and the opposite edge of the carpet is secured to the tack strip adjacent that opposite wall. A similar procedure is followed to secure the lateral edges of the carpet. The carpet is then trimmed to the exact dimensions of the room so that the carpet extends from wall-to-wall.

It is necessary to stretch wall-to-wall carpet when it is installed so that the carpet will not wrinkle, pucker, buckle or otherwise assume a non-planar shape due to dimensional changes of the carpet. Since the carpet is bounded on opposite ends by fixed walls, any significant increase in the length of the carpet due to increases in humidity or moisture conditions will produce wrinkling, puckering or buckling of the carpet. Therefore, carpets are usually stretched or "kicked in" during installation to avoid problems associated with humidity or moisture induced dimensional changes.

Stretching of wall-to-wall carpet does not always solve the problem of wrinkling or buckling of the carpet over time. Frequently, wall-to-wall carpets must be re-stretched due to elongation of the carpet under tension.

Due to the disadvantages of the tack strip method of installing wall-to-wall carpet, alternative methods of installation have been developed. One such alternative method is to glue the carpet to the floor with an adhesive. However, when the carpet is removed, particularly carpet that includes an integral, cushioning pad, a significant residue is left on the floor requiring relatively large amounts of labor to prepare the floor for a subsequent installation of another floor covering. Furthermore, like tack-strip installed carpet, glued-down carpet cannot be removed easily for cleaning.

Another alternative method of installation of wall-to-wall carpet is the hooks and loops, such as Velcro, method of installation. Instead of installing tack strips around the periphery of a room, strips of either hooks or loops are glued to the floor. Corresponding mating strips of hooks or loops are then glued or otherwise attached to the edge of the carpet so that when the strip on the floor is contacted with the strip on the carpet, the hooks and loops will form a temporary mechanical bond.

The traditional methods of installing wall-to-wall carpet described above have several disadvantages. First, they are labor intensive and time consuming processes, and, therefore, are relatively expensive to perform. Second, installation is relatively permanent; therefore, the carpet cannot be easily removed for cleaning. Third, installation requires special tools. Fourth, the installation is not conducive to working with combinations of carpets, colors and the like, for design development and color contrast visual effects. Last, the take-up and removal of traditionally installed carpet is a relatively significant portion of the cost of replacing carpet. Thus, a need exists for an improved method of installing wall-to-wall carpet that overcomes the disadvantages of the prior art.

Carpet tile was thought to be one solution to the problems of installation and removal of wall-to-wall or broadloom carpet. However, due to cupping and doming problems sometimes associated with carpet tile, they are frequently installed using traditional adhesive products. The use of adhesive makes the removal of carpet tile labor intensive and therefore expensive.

U.S. Pat. Nos. 6,012,261; 6,438,908 and 6,591,578 (the disclosures of which are all incorporated herein by reference) disclose systems for installing wall-to-wall carpet without the use of traditional adhesives or tack strips. Although these patents demonstrate a significant advance over the prior art, the present invention represents the next generation of this technology.

Other floor covering products such as wood, wood laminate, ceramic tile, vinyl sheeting, vinyl tile, stone, brick and marble frequently use adhesives or other permanent or semi-permanent methods of installation, and are difficult and expensive to remove. With some of these products, the removal process is so difficult that the floor covering product is damaged or destroyed in the removal process.

It would, therefore, be desirable to provide a floor covering system that can easily be applied and removed from floor surfaces without the use of traditional adhesives or tack strips. It would also be desirable to provide a floor covering system that can be removed from a floor surface without significantly damaging the floor covering product or the floor surface to which it is applied. It would also be desirable to provide a floor covering system that can be used with a variety of different floor covering materials.

SUMMARY OF THE INVENTION

The present invention satisfies the foregoing needs by providing a floor covering system comprising a floor covering material having a face surface and a back surface and a layer of polyurethane on the back surface of the floor covering material, the polyurethane having a cure index of between approximately 70 and 90.

In an alternate embodiment, the present invention comprises a composite product comprising a layer of foam and a first layer of polyurethane on one surface of the foam, the first layer of polyurethane having a cure index of between approximately 70 and 90.

In another alternate embodiment, the present invention comprises a product comprising a layer of polyurethane foam having a first surface and a second surface and a first layer of polyurethane on the first surface of the foam. The first layer of polyurethane has a cure index of between approximately 70 and 90. A layer of nonwoven polyester is attached to the second surface of the foam and a second layer of polyurethane is attached to a surface of the nonwoven polyester opposite the polyurethane foam. The second layer of polyurethane also has a cure index of between approximately 70 and 90.

In yet another alternate embodiment, the present invention comprises a method comprising the steps of applying to subflooring an uncured first layer of polyurethane and permitting the first layer of polyurethane to cure, the first layer of polyurethane having a cure index of between approximately 70 and 90. In accordance with certain embodiments of the present invention, the method can further comprise applying to the cured first layer of polyurethane a back surface of a floor covering material, wherein the back surface of the floor covering material comprises a layer of polyurethane having a cure index of between approximately 70 and 90. In select embodiments of the present invention, the floor covering material can be carpet, carpet tile, wood, wood laminate, vinyl sheet, vinyl tile, ceramic tile, stone, brick or marble.

In still another alternate embodiment, the present invention comprises a method comprising the steps of applying to a smooth subflooring a floor covering material having a face surface and a back surface and a layer of polyurethane on the back surface of the floor covering material, the polyurethane having a cure index of between approximately 70 and 90, wherein the floor covering material is applied to the subflooring such that the layer of polyurethane contacts the subflooring.

In yet another alternate embodiment, the present invention comprises a method comprising the steps of applying to subflooring an uncured polymer layer and permitting the polymer layer to cure. In accordance with certain embodiments of the present invention, the method can further comprise applying to the cured polymer layer a back surface of a floor covering material, wherein the back surface of the floor covering material comprises a layer of polyurethane having a cure index of between approximately 70 and 90, such that the polyurethane layer and the polymer layer removably retain the floor covering on the subfloor.

Accordingly, it is an object of the present invention to provide an improved floor covering system.

Another object of the present invention is to provide a floor covering system wherein the floor covering can be relatively easily applied to floor surfaces of different materials.

Still another object of the present invention is to provide a floor covering system wherein the floor covering can be relatively easily removed from the floor surface.

A further object of the present invention is to provide a floor covering system wherein a floor covering material can be relatively easily applied to a floor surface from which another floor covering material has been removed.

Still another object of the present invention is to provide a floor covering system that does not use adhesives or tack strips to retain the floor covering material on a floor surface.

Yet another object of the present invention is to provide a floor covering system wherein floor coverings of different types and different materials can be used.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
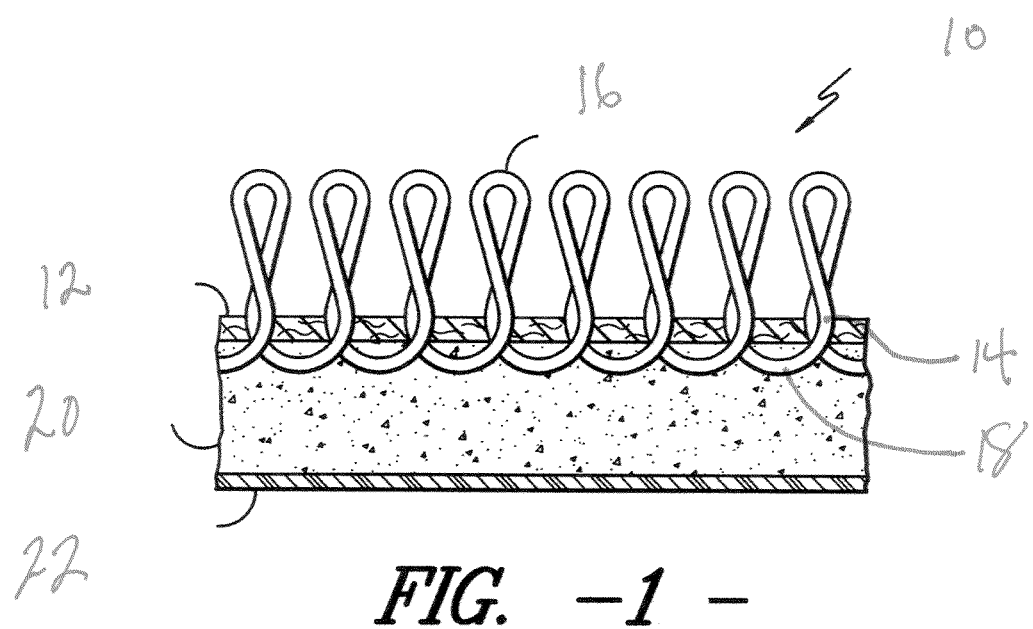
FIG. 1 is a side cross-sectional view of a disclosed embodiment of a floor covering product in accordance with the present invention.

As used herein, the term "Cure Index" is the quotient of available isocyanate groups of the Part A or A Side and available hydroxyl groups of the Part B or B Side multiplied by 100; i.e., (Iso/Polyol)×100. Available isocyanate groups are NCO groups. Available hydroxyl groups are OH groups.

Very generally, the present invention comprises a floor covering material with a layer of polyurethane on one face of the material. The floor covering material can be virtually any material used to cover flooring. Exemplary materials include, but are not limited to, broadloom carpet, carpet tile, wood, wood laminate, vinyl sheeting, vinyl tile, ceramic tile, brick, stone and marble. The polyurethane that is used to coat a surface of the floor covering material and optionally the floor or subfloor in accordance with the present invention is any polyurethane forming components that can be coated onto the floor covering material or floor so that it adheres thereto and cures in situ. In prior art polyurethanes used in connection with floor covering materials, the polyurethane typically has a Cure Index of 100 or greater. However, the polyurethane used in the present invention has a low Cure Index of approximately 70 to approximately 90; preferably, approximately 75 to approximately 85; especially, approximately 80. Within this range of Cure Index, generally speaking, the higher the number of the Cure Index the less adherent is the polyurethane layer to a smooth, shinny surface or to a polymer coated surface as described further below. Conversely, the lower the Cure Index the greater the adherence. Although a Cure Index below 70 would be desirable from an adhesion stand point, polyurethanes with a Cure Index of below approximately 70 generally tend not to be solid enough to form a useful layer.

As is well known in the art, polyurethane is typically the reaction product of a hydrocarbon having reactive hydroxyl functional units (B Side) and an isocyanate (A Side). The hydrocarbon having reactive hydroxyl functional units is typically a polyol. In the present invention, any polyol, or polyol mixture, typically used to form polyurethane can be used in the formulation or composition and such polyols are well known to those skilled in the art. However, the available hydroxyl units of the polyol and the amount of the polyol used in at least selected embodiments of the disclosed compositions or formulations of the present invention should be such that the polyurethane has a Cure Index as disclosed above. Polyols useful in the disclosed embodiments of the present invention include, but are not limited to, polyethylene glycol, polypropylene glycol, polybutylene glycol, 1,2-poly-dimethylene glycol, polydecamethylene glycol, polyether polyols derived from propylene oxide, ethylene oxide and mixtures of such oxides; ethylene oxide capped co-polymers of ethylene oxide and propylene oxide; and mixtures thereof. Linear polyols tend to form somewhat softer polyurethanes, while branched or multifunctional polyols tend to form somewhat harder polyurethanes. Although both linear and branched or multifunctional can be used in the present invention, multifunctional polyols are preferred. Preferred polyols have an average molecular weight of about 2,000 to about 6,000, and particular preferred polyols have a molecular weight of about 3,000 to about 5,000.

In the present invention, the isocyanate that is used in the polyurethane compositions or formulations is any isocyanate, or isocyanate mixture, that can be reacted with the hydroxyl-functional components; i.e., the polyols or polyol mixtures, to form polyurethane. Particularly suitable isocyanates include, but are not limited to, aromatic diisocyanates as they are more reactive and less toxic than the aliphatic diisocyanates. Preferred isocyanates are methylene diphenyl 4,4'-diisocyanate ("MDI") and a polymeric MDI (polymethylene polyphenyl-isocyanate that contains MDI). Other suitable isocyanates include, but are not limited to, 2,4-toluene diisocyanate, 2,6-toluene diisocyanate, methane diisocyanate, naphthylene 1,4-diisocyanate, diphenylmethyl-4,4'-diisocyanate, 3,3'-dimethoxy biphenylene diisocyanate, 4,4'-diphenylene diisocyanate, 1,6-hexamethylene diisocyanate; 3,3'-dimethoxy biphenylene diisocyanate, modified MDI, and mixtures thereof. As stated above, in the prior art isocyanate usually is employed in stoichiometric excess to assure complete reaction with the functional groups of the polyols to produce a Cure Index of 100 or greater. However, in the present invention, reduced amounts of isocyanate are used compared to those amounts required for a stoichiometric reaction so as to produce a polyurethane with a Cure Index of approximately 70 to approximately 90.

Chain extenders, such as diethylene glycol, dipropylene glycol, triethylene glycol, and tripropylene glycol may also be used. In fact, it is desirable in certain disclosed embodiments of the present invention to include a relatively high levels of chain extender compounds. Generally speaking, it is desirable to use about 0 to about 24 parts by weight chain extender per 100 parts by weight of hydroxyl-containing components in the disclosed compositions or formulations of the present invention; preferably, about 5 to about 22 parts by weight; more preferably, about 10 to about 18 parts by weight.

Polyurethane catalysts are well known in the art and are useful in the disclosed compositions or formulations of the present invention. Suitable catalysts are those which promote polyurethane formation and include, but are not limited to, organic metal compounds, such as tin octoate, dimethyltin diacetate, diethyltin diacetate, dibutyltin diacetate, nickel acetylacetonate; amines, such as tertiary amines, for example, 1,4 diaza-bicyclo-octane (triethylenediamine), diethylenediamine and triethyldiamine ("TEDA"); metal soaps, such as dibutyl tin dilaurate, stannous octoate; and mixtures thereof. For certain applications, a heat sensitive, delayed action catalyst may be preferred, such as DABCO WT (a formic acid blocked TEDA) available from Air Products. Generally speaking, it is desirable to use about 0 to about 2 parts by weight catalyst per 100 parts by weight of hydroxyl-containing components in the disclosed compositions or formulations of the present invention; preferably, about 0.01 to about 2.0 parts by weight; more preferably, about 0.02 to about 0.5 parts by weight.

The polyurethane compositions of at least selected disclosed embodiments can contain any of the additives typically added to polyurethane compositions used, for example, in the textile or carpet industry, such as fillers, additives, agents, colorants, flame retardants, antimicrobial agents, wetting agents, surfactants, blowing agents, such as water or low boiling fluorocarbons, odor control agents, and/or the like.

One such typical additive is a filler, which is usually used to reduce costs. Filler is used in at least selected of the present disclosed embodiments to reduce cost, to add recycled content, and/or the like. Preferred fillers for use in the polyurethane compositions of at least certain of the disclosed embodiments are coal fly ash, glass cullet, post-consumer glass cullet, alumina trihydrate, barium sulphate, foundry sand, used foundry sand, metal, recycled metal, magnetite, iron oxides, ferrite, iron, steel, nickel, metals, recycled metals, barite, sand, glass, recycled glass, recycled soda lime glass, glass particles, glass fibers, gypsum, recycled gypsum, coal fly ash, calcium carbonate, magnesium carbonate, magnesium sulfate, aluminum hydrate, barium sulfate, aluminum silicate, diatomaceous earth, asbestos fibers, silica, titanium dioxide, barytes, carbon black, cork, recycled cork, clay, rubber, recycled rubber, waste flooring, recycled flooring, recycled carpet tile, other particles, chips, fibers, or the like, and/or blends and combinations thereof. A preferred filler is Kaolin clay. Fillers are typically added in amounts by weight totaling from 0% to about 95%. Fillers are typically fine ground particles less than 50 mesh (297 microns) in size but may be larger, a mixture of sizes and/or shapes, or the like. However, any suitable filler or combination of fillers can be used. Generally speaking, it is desirable to use 0 to about 500 dry parts by weight filler per 100 parts by weight hydroxyl-containing components in the disclosed formulations of the present invention; preferably, about 100 to about 300 dry parts by weight filler per 100 parts by weight hydroxyl-containing components.

Although it is contemplated that certain disclosed embodiments of the polyurethane composition may be used as an elastomer, it is also specifically contemplated that standard polyurethane compositions can also be used to make other aspects of the invention, such as in a foam or cellular form. To make a foam or cellular product, the polyurethane can be either chemically blown or mechanically frothed, using methods well known in the art. To produce a chemically blown composition, blowing agents, such as water or low boiling fluorocarbons, may be included in the polyurethane composition. To produce mechanically frothed foams or cellular products, one or more surfactants may be included in the polyurethane composition. For such foam products, standard polyurethane formulations producing standard Cure Indexes of 100 or greater would be used Referring now in more detail to the drawings in which like numbers indicate like elements throughout the several views, there is shown in FIG. 1 a disclosed embodiment of a textile floor covering material, such as a carpet 10, in accordance with the present invention. The carpet 10 is of a conventional tufted construction well known in the art and comprises a primary backing material 12 through which tufts of yarn 14 are formed. The tufts of yarn 14 form a face pile 16 on one side of the carpet 10 and loop backs 18 on the other side. In order to secure the tufts of yarn 14 in the primary backing 12, the surface of the primary backing opposite the face pile 16 is coated with a layer 20 of an elastomer, such as polyurethane or latex, for example styrene-butadiene latex. This layer 20 usually is referred to as a precoat. On the surface of the precoat layer 20 opposite the primary backing 12 is formed a layer 22 of the low Cure Index polyurethane of the present invention; i.e., polyurethane having a Cure Index of 70 to 90.

Figure 2:
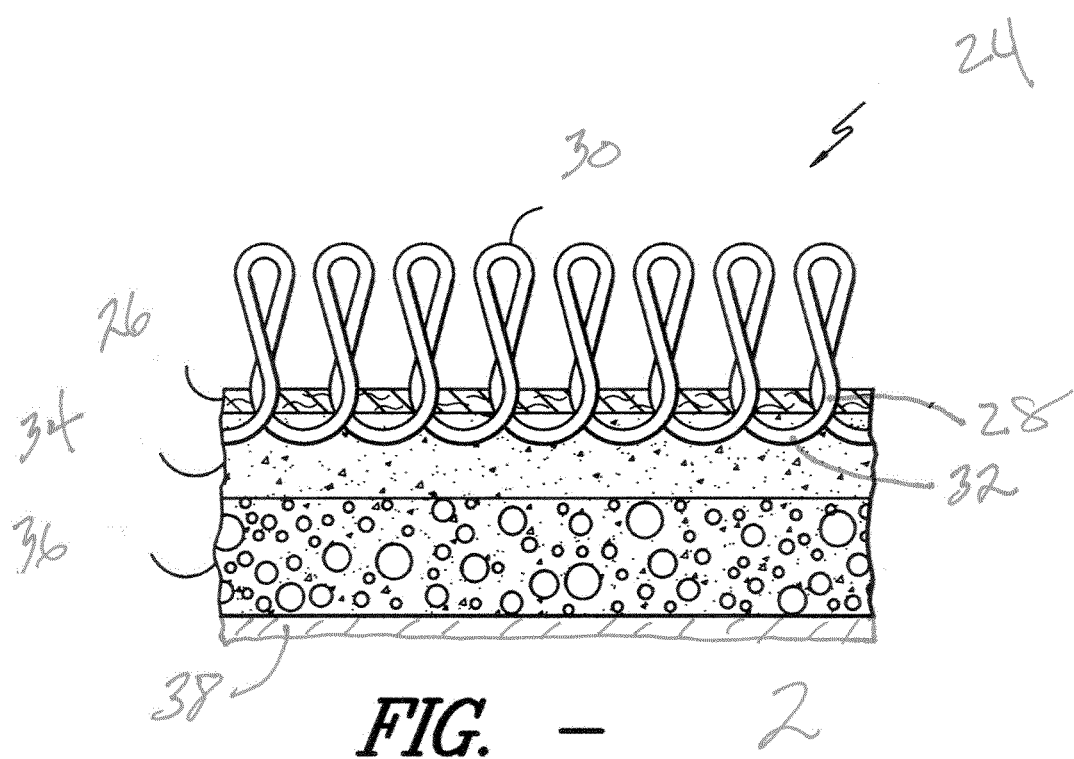
FIG. 2 is a side cross-sectional view of an alternate disclosed embodiment of a floor covering product in accordance with the present invention.

With reference to FIG. 2, there is shown a typical cushioned carpet construction. There is shown a carpet 24 of a conventional tufted construction comprising a primary backing material 26 through which tufts of yarn 28 are formed. The tufts of yarn 28 form a face pile 30 on one side of the carpet 10 and loop backs 32 on the other side. Coated on the back side of the carpet is a precoat layer 34 of an elastomer. And, formed on the side of the precoat layer 34 opposite the primary backing 26 is a layer of cushion foam 36, which is typically made from a conventional blown or frothed polyurethane formulation. On the side of the foam layer 36 opposite the precoat layer 34 is formed a layer 38 of the low Cure Index polyurethane of the present invention; i.e., polyurethane having a Cure Index of 70 to 90.

Figure 3:
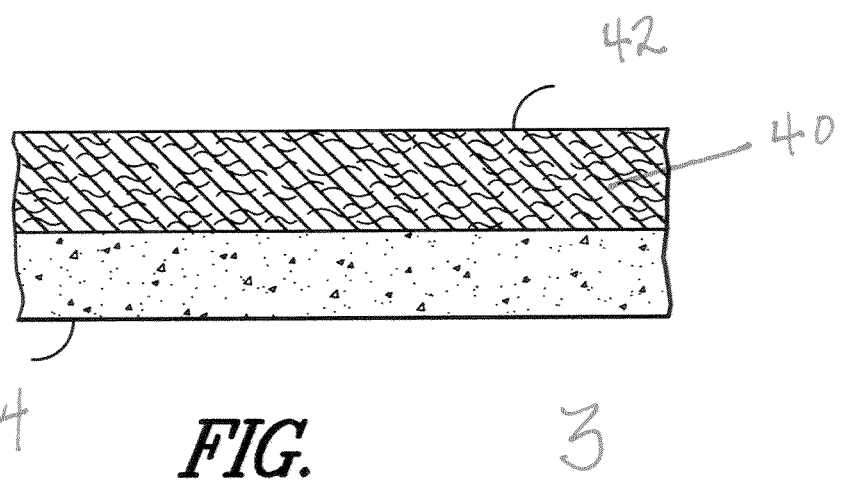
FIG. 3 is a side cross-sectional view of another alternate disclosed embodiment of a floor covering product in accordance with the present invention.

With reference to FIG. 3, there is shown a non-textile floor covering material, such as a vinyl tile 40. The vinyl tile 40 has a finished or show surface 42 on one side thereof. Formed on the surface of the vinyl tile 40 opposite the show surface 42 is a layer 44 of the low Cure Index polyurethane of the present invention; i.e., polyurethane having a Cure Index of 70 to 90. The low Cure Index polyurethane layer 44 can be formed on the wood laminate flooring 40 by any conventional means, such as by spraying, brushing, or rolling the uncured polyurethane reactants onto the surface of the flooring material and allowing the polyurethane to cure in situ. Curing of the polyurethane coating can be accelerated by heating the polyurethane coated flooring material, such as in a forced air oven. Other non-textile flooring products can be coated in a similar fashion.

Figure 4:
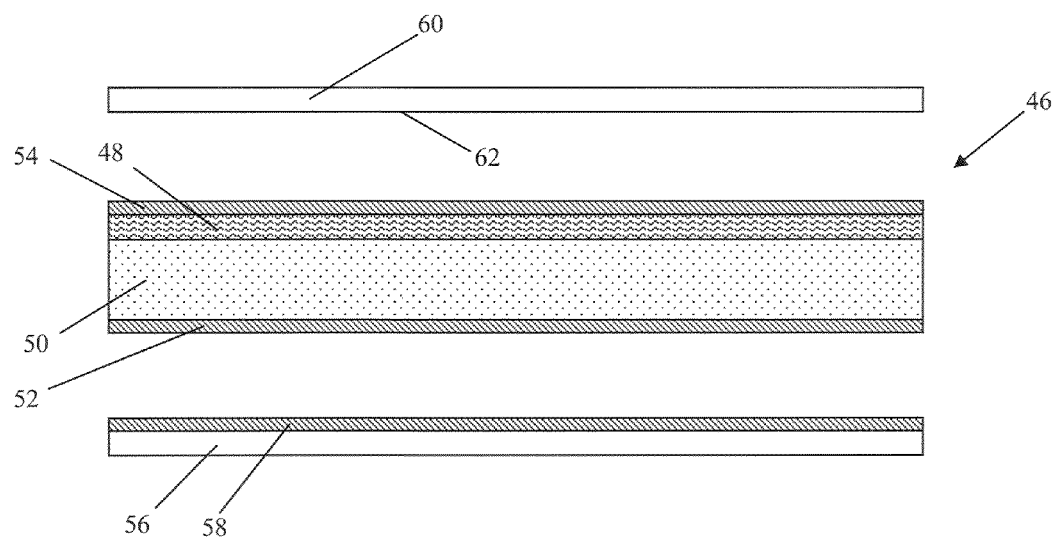
FIG. 4 is a side cross-sectional view of a disclosed embodiment of a floor having a surface to be covered and an intermediate layer and a floor covering product in accordance with the present invention.

With reference to FIG. 4, there is shown a floor covering material 46 that is designed to be used as an intermediate floor covering material 46; i.e., between the floor or subflooring and a decorative floor covering material. The intermediate floor covering material 46 comprises a composite of several layers of material. Specifically, the intermediate floor covering material 46 comprises a nonwoven layer 48. The nonwoven layer 48 can be any heat stable nonwoven material, such as fiberglass, but is preferably polyester. The nonwoven layer 48 can be of any suitable weight and thickness; however, it preferably has a weight of approximately 1.8 to approximately 2.2 pounds per square yard; especially approximately 2.0 pounds per square yard, and has a thickness of approximately 0.013 inches to approximately 0.022 inches; especially approximately 0.018 inches. A suitable nonwoven polyesters is sold under the designation M137X by Polymer Group Inc. of Charlotte, N.C.

On one surface of the nonwoven layer 48 is a layer of polyurethane foam 50. The polyurethane foam is made by conventional techniques well known in the art. The layer 50 of polyurethane foam can be of any suitable weight and thickness; however, it preferably has a weight of approximately 24 pounds per cubic foot or greater, and has a thickness of approximately ½ inch to approximately 1/32 of an inch.

On the surface of the polyurethane foam layer 50 opposite the nonwoven layer 48 is a layer of the low Cure Index polyurethane 52. On the surface of the nonwoven layer 48 opposite the polyurethane foam layer 50 is a layer of the low Cure Index polyurethane 54. Both layers of low Cure Index polyurethane 52, 54 are of any suitable thickness; however, they preferably have a thickness of approximately 1 mm to approximately 15 mm; especially approximately 3 mm.

The intermediate floor covering material 46 is used as follows. If the floor upon which the floor covering is to be installed is smooth and shiny, the intermediate floor covering material 46 can be applied to the floor simply by placing it such that the low Cure Index polyurethane layer 52 is in contact with the smooth, shiny surface of the floor. The low Cure Index polyurethane layer 52 will adhere to the smooth shiny surface of the floor sufficiently to hold the intermediate floor covering material 46 in place. However, the adhesion between the intermediate floor covering material 46 and the smooth, shiny floor surface is sufficiently weak that the intermediate floor covering material can be removed from the floor relatively easily by pulling the intermediate floor covering material up and way from the floor and peeling it away from the floor surface.

If the subfloor or floor 56 is not sufficiently smooth or shiny, the floor surface can be treated in order to make it suitable for adhesion to the intermediate floor covering material 46. In one embodiment, the floor 56 is coated with a layer 58 of the low Cure Index polyurethane. The layer of low Cure Index polyurethane 58 can be of any suitable thickness; however, it preferably has a thickness of approximately 0.1 mm to approximately 3 mm; especially approximately 1 mm. The layer of low Cure Index polyurethane 58 can be applied to the floor 56 by any suitable means, such as by spraying, brushing, squeegeeing or the like.

Alternately, instead of applying the layer of low Cure Index polyurethane 58 to the floor 56, any polymer coating that renders the floor smooth and shiny can be used. For example, the polymer coatings disclosed in applicant's co-pending U.S. Patent application Publication No. US 2009/0071097 filed Sep. 17, 2008 and U.S. Pat. No. 6,591,578 (both of which are incorporated herein by reference) can be used to coat the floor 56 in the same manner as the layer of low Cure Index polyurethane 58.

The intermediate floor covering material 46 can be applied to the floor 56 simply by placing it such that the low Cure Index polyurethane layer 52 is in contact with the low Cure Index polyurethane layer 58. The low Cure Index polyurethane layer 52 will adhere to the low Cure Index polyurethane layer 58 sufficiently to hold the intermediate floor covering material 46 in place. However, the adhesion between the low Cure Index polyurethane layer 52 of the intermediate floor covering material 46 and the low Cure Index polyurethane layer 58 on the floor 56 is sufficiently weak that the intermediate floor covering material can be removed from the floor relatively easily by pulling the intermediate floor covering material up and way from the floor and peeling it away from the low Cure Index polyurethane layer 52.

With the intermediate floor covering material 46 installed on the floor 56 as described above, there are several different flooring materials that can be applied to the low Cure Index polyurethane layer 54. For example, a section of wood laminate flooring 60 can be applied to the intermediate floor covering material 46 by contacting the low Cure Index polyurethane layer 54 with the back or unfinished side 62 of the wood laminate flooring 60. Even if the back 62 of the wood laminate flooring 60 is slightly rough, the cushioning effect of the intermediate floor covering material 46 is sufficient that the low Cure Index polyurethane layer 54 deforms slightly and conforms to the uneven back surface of the wood laminate flooring. The adhesion between the low Cure Index polyurethane layer 54 and the back 62 of the wood laminate flooring 60 is sufficiently great to hold the wood laminate flooring in place on the floor, but sufficiently weak that the wood laminate flooring can be relatively easily removed from the floor by simply lifting the wood laminate flooring up and away from the intermediate floor covering material 46.

Alternately, instead of wood laminate flooring 60, the back surface of stone, brick or marble can be applied to the low Cure Index polyurethane layer 54 of the intermediate floor covering material 46 in the same manner as described above for the wood laminate flooring 60. Or, the low Cure Index polyurethane layer 22 of the carpet 10 can be applied to the low Cure Index polyurethane layer 58. Or, the low Cure Index polyurethane layer 38 of the cushioned carpet tile 24 can be applied to the low Cure Index polyurethane layer 58. Or, the low Cure Index polyurethane layer 44 of the vinyl tile 40 can be applied to the low Cure Index polyurethane layer 58.

Figure 5:
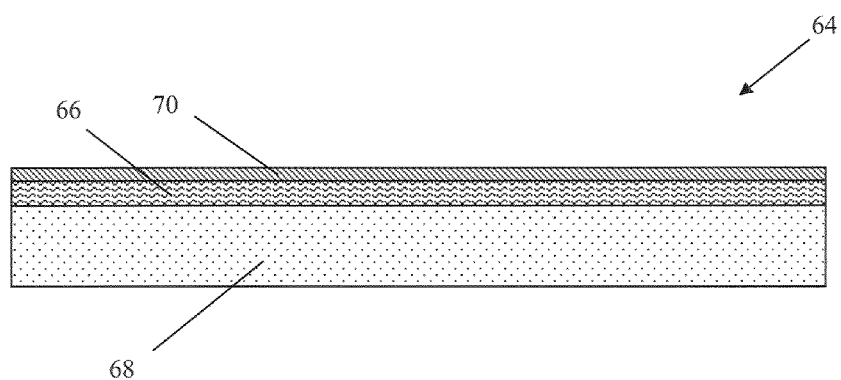
FIG. 5 is a side cross-sectional view of alternate disclosed embodiment of an intermediate layer in accordance with the present invention.

With reference to FIG. 5, there is shown an alternate embodiment 64 of the intermediate floor covering material. The intermediate floor covering material 64 comprises a composite of several layers of material. Specifically, the intermediate floor covering material 64 comprises a nonwoven layer 66. The nonwoven layer 66 can be any heat stable nonwoven material, such as previously described above. On one surface of the nonwoven layer 66 is a layer of polyurethane foam 68, as described above. On the surface of the nonwoven layer 66 opposite the polyurethane foam layer 68 is a layer of the low Cure Index polyurethane 70, as described above. This embodiment of the intermediate floor covering material 64 can be used on a floor surface that is sufficiently rough that there is enough gripping action between the polyurethane foam layer 68 and the rough floor surface so as to hold the intermediate layer 64 in place.

Figure 6:
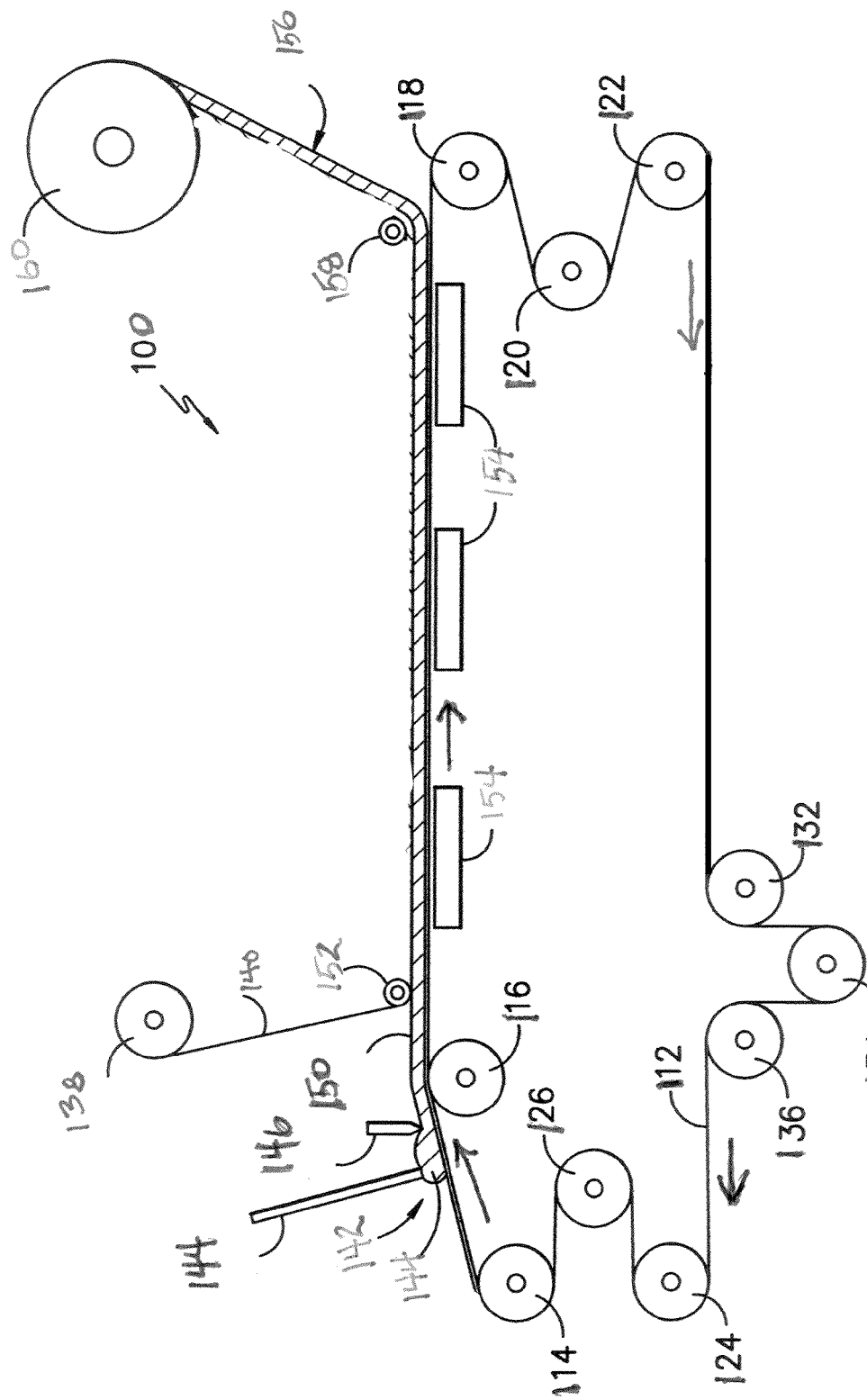
FIG. 6 is a side schematic view of a disclosed embodiment of an apparatus for manufacturing floor covering products in according with the present invention.

With reference to FIG. 6, there is shown an exemplary apparatus 100 for forming or applying a layer of the low Cure Index polyurethane on a textile, fabric, or other material, or for producing the intermediate floor covering material 46 in accordance with the present invention. The apparatus 100 includes an endless belt 112 extending along an endless conveyor path over the rollers 114, 116, 118, 120, 122, 124 and 126 of which some are driven by an electric motor (not shown), and belt tensioning rollers 132, 134 and 136 (FIG. 1). The belt 112 moves in a continuous loop in the direction shown by the arrows (FIG. 1). The speed of the belt 112 is preferably variably controllable to adjust to varying manufacturing needs, for continuous or intermittent production or the like. Generally, for producing coated carpet, fabric or textile products, belt speeds that are useful in the present invention may preferably be about 8 to about 80 feet per minute, especially, preferably about 10 to about 60 feet per minute. Other speeds can also be used depending on the product that is being manufactured, the number of layers, the thickness, the type and amount of heat or catalyst being used, and/or the like.

From the roller 114, the belt 112, which preferably is constructed from fiberglass coated with a low coefficient of friction coating, such as Teflon® (polytetrafluoroethylene), passes around the rollers 116, 118, 120 and 122. The belt 112 is passed over the tensioning rollers 132, 134 and 136 to properly tension the belt. Then, the belt 112 is passed over the rollers 124 and 126 and back to the roller 114.

When preparing the intermediate floor covering material 64, a roll 138 of nonwoven material 140 (such as that used to form the layer of nonwoven material 48 or 66 as shown in FIGS. 4 and 6) is disposed above the belt 112. A polyurethane deposition station 142 applies a polyurethane foam reactant mixture onto the belt 112 in a puddle 144. The polyurethane deposition station 142 includes two reactant reservoirs (not shown), a reactant mixer (not shown) for the A-side and B-side of the polyurethane reactants and a mechanical polyurethane frothing apparatus (not shown) for frothing or foaming the polyurethane reactants and a flexible discharge hose 144 extending above the belt 112. In order to assure a uniform lay down of the polyurethane foam reactants onto the belt 112, the end of the hose 144 is preferably positioned about 0.25 inch to about 6 inches, more preferably about 2.0 inches above the belt 112. Additionally, the centerline of the hose 144 is preferably positioned about 1 inch to about 10 inches, more preferably about 3 inches, upstream from a spreading device or doctor blade 146. The polyurethane foam reactants are deposited from the lower end of hose 144 on to the nonwoven fabric 140 in an amount such that they form a puddle or rolling bank 148 in front of the doctor blade 146. The deposited polyurethane foam reactant mixture is then smoothed and spread into a first reactive foam layer 150 of uniform thickness by the doctor blade 146 positioned at a desired distance above the belt 112. The polyurethane foam reactant mixture is preferably formed into a layer 150 of about of approximately 1/32 of an inch to approximately 1/2 of an inch in thickness.

Simultaneously with the deposition of the polyurethane foam reactants onto the belt 112, The nonwoven fabric 140 is dispensed from a supply roll 138 and is fed under a marriage bar or roller 152 to tension and marry the nonwoven fabric 140 to the layer 150 of polyurethane foam reactants.

After the nonwoven fabric 140 is applied to the layer 150 of polyurethane foam reactants, the composite is be heated to cure the polyurethane reactants of layer 150. This is accomplished by passing the composite comprising the nonwoven fabric 140 and the bottom layer of polyurethane foam reactants 150 over a series of heaters or heated platens 154 which raise the temperature of the polyurethane foam reactants sufficiently to cure them, such as preferably about 150° to 350° F.; more preferably about 250° to 300° F. Each of the heaters 86 may be operated at a different temperature depending on the type of product or properties desired. Also, cooling or fan elements or equipment (not shown) may be used to cool the product or composite to room temperature, for example, in the final stages of product formation, prior to cutting, prior to rolling, or the like.

Finally, the nonwoven fabric 140, together with the attached layer 150 of cured polyurethane foam, is stripped from the belt 112 by passing the composite or precursor 156 over a stripper roller 158 and rolled onto a take-up reel 160 as a product, intermediate product or sent to a cutter (not shown) to be slit, trimmed, or cut.

In order to make either of the intermediate layers 46, 64, the roll 160 from the previous processing step would be position in the place of the roll 138, as shown in FIG. 6, and run through the machine 100 again with the side of the nonwoven material opposite the polyurethane foam facing downward. Also, instead of applying a polyurethane foam reactant mixture, a low Cure Index polyurethane reactant mixture would be applied to the belt 112 from the hose 144 at the polyurethane deposition station 142. The low Cure Index polyurethane reactant mixture would then be shaped into a layer by the doctor blade 146. And, the uncoated side of the nonwoven fabric would be run under the marriage bar or roller 152, so as to tension and marry the nonwoven fabric 140 to the layer of Loe Cure Index polyurethane reactants.

After the nonwoven fabric is applied to the layer of low Cure Index polyurethane reactants, the composite is be heated to partially cure the low Cure Index polyurethane reactants. This is accomplished by passing the composite comprising the nonwoven fabric 140, the bottom layer of low Cure Index polyurethane reactants 150 and the top layer of the cured polyurethane foam over the heaters or heated platens 154 which raise the temperature of the low Cure Index polyurethane reactants. Since the degree of cure of the cure index of the low Cure Index polyurethane is established by its formulation and not by the temperature of the curing, the low Cure Index polyurethane reactants are heated to the same temperature and for the same amount of time as in the previous step. Finally, the nonwoven fabric, together with the attached layer 150 of low Cure Index polyurethane foam and the layer of polyurethane foam, is stripped from the belt 112 by passing the composite or precursor 156 over a stripper roller 158 and rolled onto a take-up reel 160 as a product or intermediate product or sent to a cutter (not shown) to be slit, trimmed, or cut.

If the intermediate layer has the construction as shown in FIG. 6, the process is finished. However, if the intermediate layer is to have the construction as shown in FIG. 4, the roll 160 from the previous processing step would be position in the place of the roll 138, as shown in FIG. 6, and run through the machine 100 again with the side of the polyurethane foam opposite the nonwoven fabric facing downward, in the same manner as described above. This would result in the formation of a layer of low Cure Index polyurethane on the surface of the polyurethane foam opposite the nonwoven fabric and would produce the intermediate layer as shown in FIG. 4.

It should also be understood that if it is desired to produce the carpet products, as shown in FIGS. 1 and 2, the appropriate carpet product is substituted for the nonwoven fabric in the coating process described above. This will result in the formation of the low Cure Index polyurethane layer 22, as shown in FIG. 1, or the low Cure Index polyurethane layer 38, as shown in FIG. 2.

The following examples are illustrative of certain disclosed embodiments of the present invention.

Example 1

The formulation in Table 1 below is useful for applying to the backing of a carpet tile to provide a low Cure Index polyurethane layer in accordance with the present invention.

TABLE 1

| CHEMICAL | PARTS (by weight) |
| --- | --- |
| V9287 | 63.37 |
| TETRA EG | 16.63 |
| V9741 | 18.00 |
| V9446 | 1.50 |
| TEOA | 0.50 |
| KAOLIN CLAY | 60.00 |
| CATALYST | 0.20 |
| POLYOL TOTAL | 160.20 |
| ISO @ 100 | |
| C265KD | 38.12 |
| ISO TOTAL | 38.12 |
| CURE INDEX = 80 | 30.50 |
| PU TOTAL = | 190.7 |
| RATIO (B/A) = | 5.25 |

The components listed in the foregoing Table 1 are as follows: V9287 is a Voranol® brand polyether diol having a weight average molecular weight of 2,036 and a hydroxyl equivalence of 1,018 available from Dow Chemical Co.; TETRA EG is an ethylene glycol, having a weight average molecular weight of 194 and a hydroxyl equivalence of 97 available from M. E. Global (which is a joint venture between The Dow Chemical Company of the United States, and Petrochemical Industries Company of Kuwait); V9741 is a Voranol® brand polyether triol having a weight average molecular weight of 4,950 and a hydroxyl equivalence of 1,650 available from Dow Chemical Co.; V9446 is a Voranol® brand polyol having a weight average molecular weight of 567 and a hydroxyl equivalence of 126 available from Dow Chemical Co.; TEOA is triethanol amine available from Ashland Chemical Co.; Kaolin Clay is available from Huber Corp.; and C265KD is MDI available from Textile Rubber and Chemical Co., Inc. Dalton, Ga.

Example 2

The formulation in Table 2 below is useful for applying to a floor or subfloor to provide a low Cure Index polyurethane layer in accordance with the present invention.

TABLE 2

| CHEMICAL | PARTS (by weight) |
| --- | --- |
| V9287 | 63.50 |
| TPG | 16.50 |
| V9741 | 18.00 |
| V9446 | 1.50 |
| TEOA | 0.50 |
| KAOLIN CLAY | 60.00 |
| CATALYST | 0.20 |
| POLYOL TOTAL | 160.20 |
| ISO @ 100 | |
| C265KD | 39.52 |
| ISO TOTAL | 39.52 |
| INDEX = 80 | 31.62 |
| PU TOTAL = | 191.82 |
| RATIO (B/A) = | 5.067 |

The components listed in the foregoing Table 2 are as designated above in Table 1 and as follows: TPG is tripropylene glycol.

Example 3

The formulation in Table 3 below is useful for applying to the backing of a vinyl tile to provide a low Cure Index polyurethane layer in accordance with the present invention.

TABLE 3

| CHEMICAL | PARTS (by weight) |
| --- | --- |
| V9287 | 63.50 |
| TPG | 16.50 |
| V9741 | 18.00 |
| V9446 | 1.50 |
| TEOA | 0.50 |
| KAOLIN CLAY | 60.00 |
| CATALYST | 0.20 |
| POLYOL TOTAL | 160.20 |
| ISO @ 100 | |
| C265KD | 39.52 |
| ISO TOTAL | 39.52 |
| CURE INDEX = 90 | 35.57 |
| PU TOTAL = | 195.77 |
| RATIO (B/A) = | 4.504 |

The components listed in the foregoing Table 3 are as designated above in Table 1 and as follows: TPG is tripropylene glycol available from M. E. Global Co.

Example 4

The formulation in Table 4 below is useful for applying to the backing of a broadloom carpet to provide a low Cure Index polyurethane layer in accordance with the present invention.

TABLE 4

| CHEMICAL | PARTS (by weight) |
| --- | --- |
| V9287 | 68.50 |
| DPG | 11.50 |
| V9741 | 18.00 |
| V9446 | 1.50 |
| TEOA | 0.50 |
| KAOLIN CLAY | 60.00 |

TABLE 4-continued

| CHEMICAL | PARTS (by weight) |
|---|---|
| CATALYST | 0.20 |
| POLYOL TOTAL ISO @ 100 | 160.20 |
| C265KD | 40.19 |
| ISO TOTAL | 40.19 |
| CURE INDEX = 80 | 32.15 |
| PU TOTAL = | 192.35 |
| RATIO (B/A) = | 4.983 |

The components listed in the foregoing Table 4 are as designated above in Table 1 and as follows: DPG is dipropylene glycol available from M. E. Global Co.

Example 5

The formulation in Table 5 below is useful for applying to the backing of a carpet tile to provide a low Cure Index polyurethane layer in accordance with the present invention.

TABLE 5

| CHEMICAL | PARTS (by weight) |
|---|---|
| V9287 | 70.91 |
| DEG | 9.09 |
| V9741 | 18.00 |
| V9446 | 1.50 |
| TEOA | 0.50 |
| KAOLIN CLAY | 60.00 |
| CATALYST | 0.20 |
| POLYOL TOTAL ISO @ 100 | 160.20 |
| C265KD | 40.51 |
| ISO TOTAL | 40.51 |
| CURE INDEX = 80 | 32.41 |
| PU TOTAL = | 192.61 |
| RATIO (B/A) = | 4.943 |

The components listed in the foregoing Table 5 above are as designated above in Table 1 and as follows: DEG is diethylene glycol available from M. E. Global Co.

Example 6

The formulation in Table 6 below is useful for applying to sub-flooring surfaces in accordance with the present invention.

TABLE 6

| Ingredient | Trade name | Supplier | Amount (by weight) |
|---|---|---|---|
| Polyvinyl acetate homopolymer emulsion | Duroset | National Starch | 30.00 |
| Acrylic polymer emulsion $T_g$ +28 to +34° C. | Rhoplex | Rohm & Haas | 70.00 |
| Coalescent agent | Dowanol | Dow Chemical | 7.00 |
| pH adjusting agent | potassium hydroxide | Monsanto; Callaway Chemical | 0.20 |
| Thickening agent (sodium polyacrylate) | Paragum | Parachem | as required for viscosity adjustment |

Water is added to the foregoing formulation in an amount sufficient to provide a total solids content of about 40% to 43%; preferably, about 42%. Viscosity should be about 500 to 700 cps (Brookfield RVF #3 spindle @ 20 RPM); pH should be about 7.5 to 8.5.

The foregoing formulation produces a smooth, shiny coating on plywood, OSB, or other sub-flooring surfaces, that provides a suitable surface for attaching the floor covering material or intermediate floor covering material in accordance with the present invention.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A product comprising:
   a floor covering material having a face surface and a back surface; and
   a layer of polyurethane on the back surface of the floor covering, the polyurethane having a cure index consisting of 70 to 90; a flooring surface having a polymer coating thereon; and the layer of polyurethane contacting with the polymer coating on the flooring surface and releaseably adhered thereto.

2. The product of claim 1, wherein the polyurethane has a cure index consisting of 75 to 85.

3. The product of claim 1, wherein the polyurethane has a cure index consisting of 80.

4. The product of claim 1, wherein the floor covering material is carpet.

5. The product of claim 1, wherein the floor covering material is carpet tile.

6. The product of claim 1, wherein the floor covering material is wood laminate.

7. The product of claim 1, wherein the floor covering material is vinyl sheet, vinyl tile, ceramic tile or marble.

8. A composite product comprising:
   a layer of foam; and
   a first layer of polyurethane on one surface of the foam, the first layer of polyurethane having a cure index consisting of 70 to 90; a flooring surface having a polymer coating thereon; and the first layer of polyurethane contacting with the polymer coating on the flooring surface and releaseably adhered thereto.

9. The product of claim 8 further comprising a layer of a nonwoven material on a side of the foam opposite the first layer of polyurethane.

10. The product of claim 9, wherein the nonwoven material is nonwoven polyester.

11. The product of claim 8 further comprising a second layer of polyurethane on a surface of the nonwoven material opposite the foam, the second layer of polyurethane having a cure index consisting of 70 to 90.

12. The product of claim 8, wherein the foam is polyurethane foam.

13. A product comprising:
a layer of polyurethane foam having a first surface and a second surface;
a first layer of polyurethane on the first surface of the foam, the first layer of polyurethane having a cure index consisting of 70 to 90;
a layer of nonwoven polyester on the second surface of the foam;
a second layer of polyurethane on a surface of the nonwoven polyester opposite the polyurethane foam, the second layer of polyurethane having a cure index consisting of 70 to 90; a flooring surface having a polymer coating thereon; and the first layer of polyurethane contacting with the polymer coating on the flooring surface and releaseably adhered thereto.

14. A method comprising the steps of:
applying to a flooring surface an uncured layer of polyurethane;
permitting the layer of polyurethane to cure, the first layer of polyurethane having a cure index consisting of 70 to 90; and
releaseably adhering a floor covering material to the flooring surface by contacting the layer of polyurethane on the flooring surface with a back surface of the floor covering material.

15. The method of claim 14, wherein the back surface of the floor covering material includes a second layer of polyurethane having a cure index consisting of 70 to 90.

16. The method of claim 14 further comprising applying to the cured first layer of polyurethane an intermediate material comprising:
a layer of foam; and
a second layer of polyurethane on one surface of the foam, the second layer of polyurethane having a cure index consisting of 70 to 90 such that the second layer of polyurethane of the intermediate material contacts the first layer of polyurethane on the flooring surface and is releasably adhered thereto.

17. The method of claim 16, wherein the intermediate material further comprises a layer of a nonwoven material attached to a side of the foam opposite the second layer of polyurethane.

18. The method of claim 17, wherein the intermediate material further comprises a third layer of polyurethane on a surface of the nonwoven material opposite the foam, the third layer of polyurethane having a cure index consisting of 70 to 90.

19. The method of claim 18 further comprising applying to the third layer of polyurethane on the nonwoven material a back surface of a floor covering material.

20. The method of claim 19, wherein the foam is polyurethane foam and the nonwoven material is nonwoven polyester.

21. The method of claim 19, wherein the floor covering material is carpet, carpet tile, wood laminate, vinyl sheet, vinyl tile, ceramic tile or marble.

22. A method comprising the steps of:
providing a floor covering material having a layer of polyurethane on a back surface of the floor covering material, the layer of polyurethane having a cure index consisting of 70 to 90;
releaseably adhering the floor covering material to a smooth and shiny flooring surface or a flooring surface having a polymer coating thereon by contacting the flooring surface with the layer of polyurethane on the floor covering material.

23. The method of claim 22, wherein polymer coating on the flooring surface comprises a polyurethane having a cure index consisting of 70 to 90.

* * * * *